United States Patent
Jang (10) Patent No.: US 8,526,685 B2
(45) Date of Patent: Sep. 3, 2013

(54) METHOD AND APPARATUS FOR SELECTIVELY SUPPORTING RAW FORMAT IN DIGITAL IMAGE PROCESSOR

(75) Inventor: Sung-kyu Jang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 12/942,128

(22) Filed: Nov. 9, 2010

(65) Prior Publication Data
US 2011/0135151 A1   Jun. 9, 2011

(30) Foreign Application Priority Data
Dec. 7, 2009  (KR) .................. 10-2009-0120710

(51) Int. Cl.
*G06K 9/00*  (2006.01)
(52) U.S. Cl.
USPC ..................................... 382/118; 382/243
(58) Field of Classification Search
USPC ................................. 382/115–118, 243
See application file for complete search history.

(56) References Cited

U.S. PATENT DOCUMENTS

| | | | |
|---|---|---|---|
| 6,034,740 A * | 3/2000 | Mitsui et al. .................. | 348/587 |
| 6,195,513 B1 * | 2/2001 | Nihei et al. .................... | 396/332 |
| 7,573,601 B2 * | 8/2009 | Shirakawa et al. ............ | 358/1.2 |
| 8,098,298 B2 * | 1/2012 | Tsuji et al. ................. | 348/231.3 |
| 8,120,791 B2 * | 2/2012 | Shirakawa et al. .......... | 358/1.13 |
| 8,269,837 B2 * | 9/2012 | Shirakawa et al. ...... | 348/207.99 |
| 2004/0120584 A1 * | 6/2004 | Jang et al. ..................... | 382/232 |
| 2005/0237410 A1 * | 10/2005 | Shiohara .................. | 348/333.01 |
| 2008/0129844 A1 * | 6/2008 | Cusack et al. ................ | 348/241 |
| 2009/0179998 A1 * | 7/2009 | Steinberg et al. .......... | 348/222.1 |
| 2009/0273686 A1 * | 11/2009 | Kaikumaa et al. ......... | 348/222.1 |
| 2011/0096149 A1 * | 4/2011 | Au et al. ........................ | 348/47 |

* cited by examiner

*Primary Examiner* — Jingge Wu
(74) *Attorney, Agent, or Firm* — Drinker Biddle & Reath LLP (57) ABSTRACT

A digital image processing apparatus and method for supporting a RAW format (a sensor data format before image processing is performed) selectively supports a user-desired region of a captured image in a RAW format. A method of supporting a RAW format in a digital image processing apparatus includes setting at least one portion of an image displayed in a live-view mode as a region of interest (ROI), storing the ROI in a RAW format, storing a non-ROI of the displayed image, which is a portion of the image other than the ROI, in a compression format, and compositing the stored ROI with the stored non-ROI.

16 Claims, 8 Drawing Sheets

METHOD AND APPARATUS FOR SELECTIVELY SUPPORTING RAW FORMAT IN DIGITAL IMAGE PROCESSOR

CROSS-REFERENCE TO RELATED PATENT APPLICATION

This application claims the priority benefit of Korean Patent Application No. 10-2009-0120710, filed on Dec. 7, 2009, in the Korean Intellectual Property Office, the disclosure of which is incorporated herein in its entirety by reference.

BACKGROUND

1. Field of the Invention

Embodiments relate to a digital image processor, and more particularly, to a digital image processing apparatus for supporting a selected portion of an image in a RAW format.

2. Description of the Related Art

Currently, gaps between compact cameras and digital single lens reflex (DSLR) cameras in an experts' level are not large. As such, compact cameras also require functions that are generally used in DSLR cameras. Also, camera products in a level between compact cameras and DSLR cameras are actively considered. Here, DSLR refers to a method of transmitting an image of an object to a view-finder and providing light to a sensor for capturing an image, through one lens.

Demands for storing a captured image as a RAW image (a sensor data image before image processing is performed) are currently increased even in compact cameras. A RAW image is generally used in DSLR cameras and maintains image quality by not performing compression or performing lossless compression, because, if RAW conversion software is used, brightness, white balance, color tones, saturation and the like may be delicately controlled without reducing image quality.

However, RAW files are larger than JPEG files in size and thus require a larger space in a memory card. In general, a RAW image has data of about 14 bits or 16 bits, which is 4-times to 20-times greater than that of YUV422 video coding format of a JPEG image. Accordingly, a user avoids using a RAW image due to the need of a large memory capacity.

In order to solve this problem, a RAW image may be compressed. For example, only a portion of a RAW image may be compressed by adjusting a color range in a tagged image file format (TIFF). Also, compression may be performed by using a lossless coding method or a near-lossless coding method. However, a problem of compression compatibility may occur and image quality may be reduced in a near-lossless coding method.

SUMMARY

Embodiments provide a digital image processing apparatus for selectively supporting a region of interest (ROI) of an image to be stored in a RAW format.

According to an embodiment, a method of supporting a RAW format (a sensor data format before image processing is performed) in a digital image processor includes setting at least one portion of an image displayed in a live-view mode as a region of interest (ROI); storing the ROI in a RAW format; storing a non-ROI of the displayed image, which is a portion of the image other than the ROI, in a compression format; and compositing the stored ROI with the stored non-ROI.

In this case, the ROI may include at least one region of the displayed image.

Also, the ROI may be automatically set according to a condition that is predetermined based on a scene mode. For example, if the scene mode is a portrait mode, the ROI may be automatically set according to a ratio of a face region recognized on the displayed image. Furthermore, the ROI may be manually set by a user.

BRIEF DESCRIPTION OF THE DRAWINGS

The above and other features and advantages will become more apparent by describing in detail exemplary embodiments with reference to the attached drawings in which.

DETAILED DESCRIPTION

For understanding the embodiments, reference numerals are used in drawings and specific terms are used to explain exemplary embodiments illustrated in the drawings. However, the invention is not limited by the terms and the terms may have meanings that have been commonly known in the art. Hereinafter, embodiments will be described in detail by explaining the embodiments with reference to the attached drawings.

Figure 1:
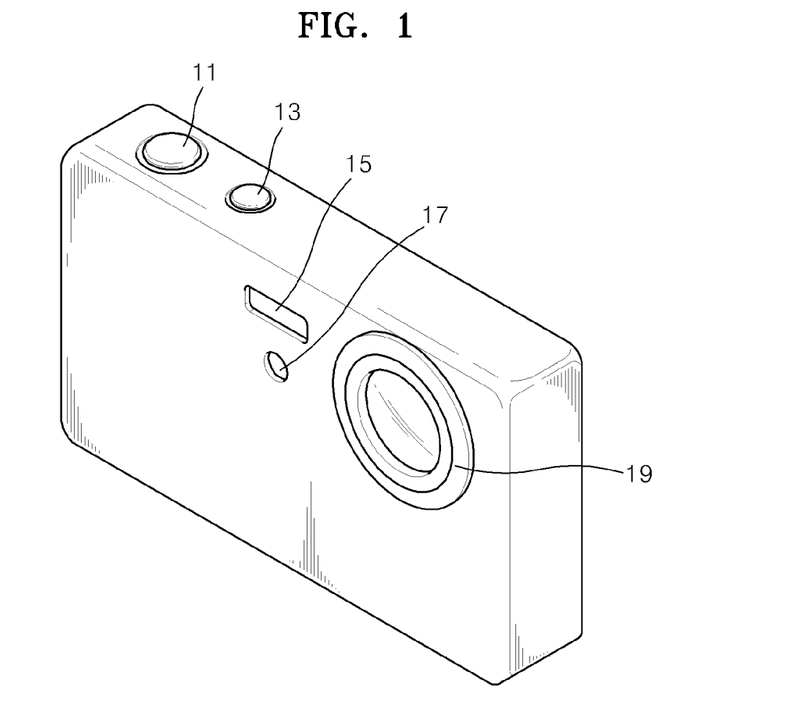
FIG. 1 is a perspective view of a digital camera as an example of a digital image processor.

FIG. 1 is a perspective view of a digital camera as an example of a digital image processor.

Referring to FIG. 1, the digital camera includes on a front surface a shutter-release button 11, a power button 13, a flash lamp 15, an auxiliary lamp 17, a lens unit 19 and the like. However, the above elements are merely exemplary elements of a digital image processing apparatus and may be variously modified to, for example, elements illustrated in FIG. 3.

Figure 2:
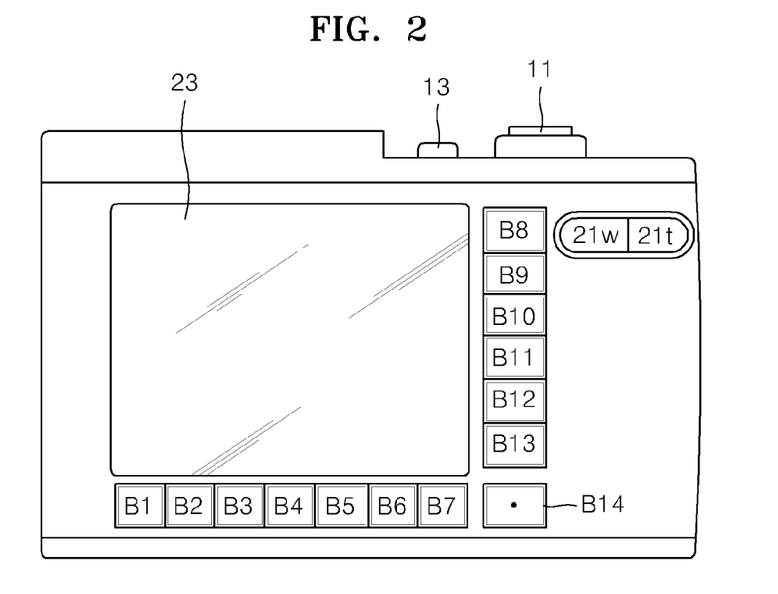
FIG. 2 is a rear view of the digital camera illustrated in FIG. 1.

FIG. 2 is a rear view of the digital camera illustrated in FIG. 1.

Referring to FIG. 2, the digital camera includes on a rear surface a wide angle-zoom button 21w, a telephoto-zoom button 21t, a display unit 23, and input buttons B1, B2, B3, B4, B5, B6, B7, B8, B9, B10, B11, B12, B13, and B14 including touch sensors or contact-type switches (hereinafter referred to as buttons B1 through B14).

Figure 3:
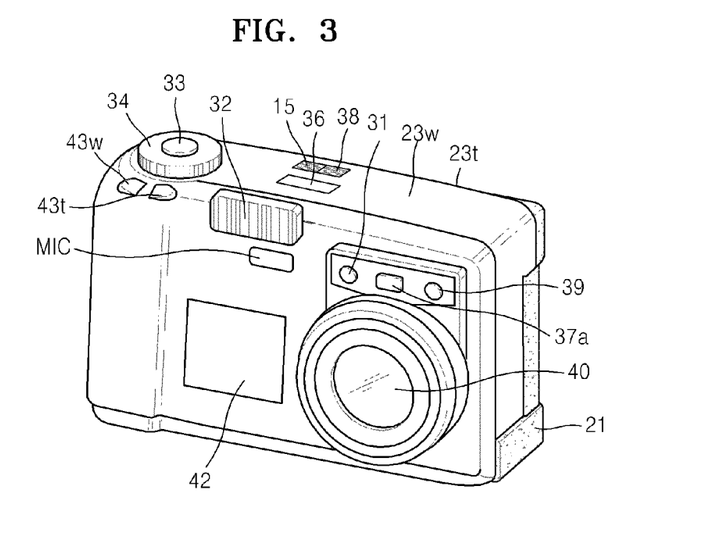
FIG. 3 is a perspective view of a dual display camera as another example of a digital image processor.
Figure 4:
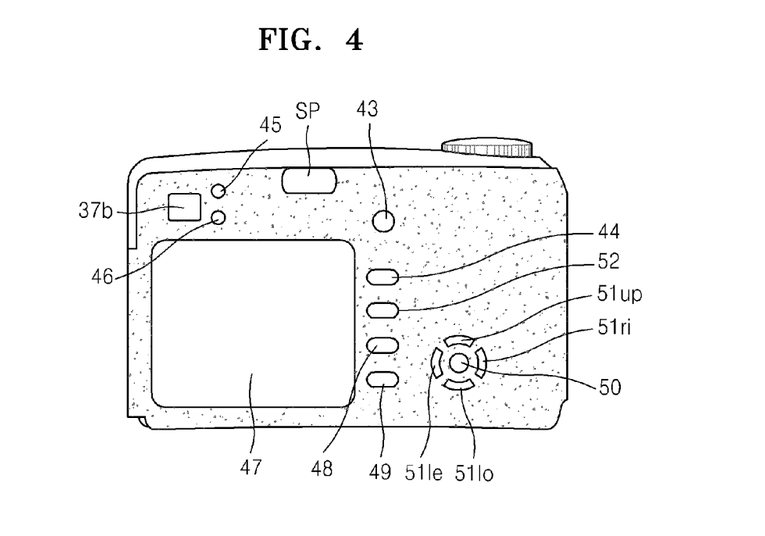
FIG. 4 is a rear view of the dual display camera illustrated in FIG. 3.

FIG. 3 is a perspective view of a dual display camera as another example of a digital image processor. FIG. 4 is a rear view of the dual display camera illustrated in FIG. 3. The dual display camera includes a second display panel 22 on a front surface as illustrated in FIG. 3 and a first display panel 35 on a rear surface as illustrated in FIG. 4.

Referring to FIG. 3, like a general digital camera having a single display, the dual display camera includes on the front surface a microphone (MIC), a self-timer lamp 31, a flash lamp 32, a shutter button 33, a function-selection button 34, a photographing-information display unit 36, a view-finder 37a, a function-block button 38, a flash light-light intensity sensor 39, a lens unit 40, an external interface 41, a wide angle-zoom button 43w, and a telephoto-zoom button 43t. The dual display camera also includes on the front surface a second display panel 42.

In a self-timer mode, the self-timer lamp 31 operates for a time from when the shutter button 33 is pressed until a shutter operates. The function-selection button 34 is used by a user to select one of a plurality of operation modes of the dual display camera, e.g., a still image capturing mode, a night landscape photographing mode, a moving image capturing mode, and a playback mode. The photographing-information display unit 36 displays information regarding photographing-related functions. The function-block button 38 is used by the user to select functions displayed on the photographing-information display unit 36.

Referring to FIG. 4, like a general digital camera having a single display, the dual display camera includes on the rear surface a speaker SP, a power button 43, a monitor button 44, an auto-focus lamp 45, a view-finder 37b, a flash stand-by lamp 46, a first display panel 47, an exposure adjustment/delete button 48, an enter/playback button 49, a menu/OK button 50, an upward button 51up, a rightward button 51ri, a downward button 51lo, a leftward button 51le, and a playback button 52.

Figure 5:
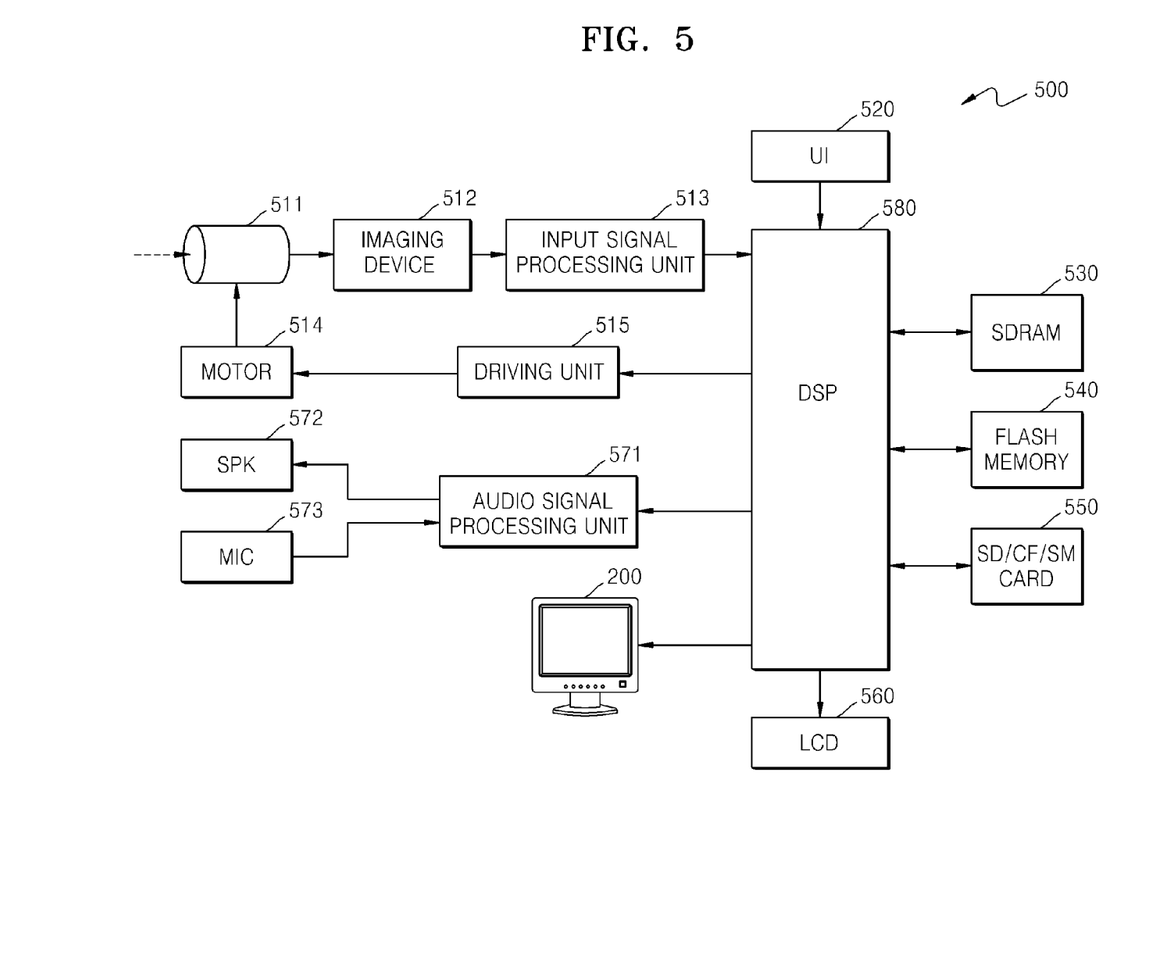
FIG. 5 is a block diagram of a digital image processing apparatus, according to an embodiment.

FIG. 5 is a block diagram of a digital image processing apparatus 500, according to an embodiment.

Referring to FIG. 5, the digital image processing apparatus 500 includes an optical unit 511 for receiving an optical signal from a subject, an imaging device 512 for converting the optical signal received by the optical unit 511 into an electrical signal, an input signal processing unit 513 for performing signal processing such as noise reduction or analog-to-digital (A/D) conversion on the electrical signal provided by the imaging device 512, a motor 514 for driving the optical unit 511, and a driving unit 515 for controlling operation of the motor 514. Also, the digital image processing apparatus 500 may include a user interface (UI) 520 for inputting a manipulation signal of a user, a synchronous dynamic random access memory (SDRAM) 530 for temporarily storing input image data, calculation data, processing results and the like, a flash memory 540 for storing algorithms and setup data required to operate the digital image processing apparatus 500, and a secure digital (SD)/compact flash (CF)/smart media (SM) card 550 for storing image files. Furthermore, the digital image processing apparatus 500 includes a liquid crystal display (LCD) 560 as a display device. In addition, the digital image processing apparatus 500 may include an audio signal processing unit 571 for converting sound into a digital signal, converting a digital signal of a sound source into an analog signal, and generating an audio file, a speaker 572 for outputting sound, and a MIC 573 for inputting sound. Moreover, the digital image processing apparatus 500 includes a digital signal processing (DSP) unit 580 for controlling operation of the digital image processing apparatus 500.

The elements of the digital image processing apparatus 500 will now be described in more detail.

The optical unit 511 may include a lens for obtaining an optical signal, an iris for adjusting the intensity of the optical signal (light intensity), and a shutter for controlling the optical signal to be input. The lens may include a zoom lens for increasing or decreasing a viewing angle according to a focal length and a focus lens for focusing on a subject. Each of the zoom and focus lenses may be formed as a single lens or a group of a plurality of lenses. The shutter may be a mechanical shutter for moving a lens shade up and down. In this case, instead of including an additional shutter device, providing of an electrical signal to the imaging device 512 may be controlled so as to function as the shutter.

The motor 514 for driving the optical unit 511 may control the position of the lens, opening or closing of the iris, operation of the shutter and the like so as to perform auto focus (AF), auto exposure (AE), aperture adjustment, zooming, focus changing and the like.

The motor 514 is controlled by the driving unit 515. The driving unit 515 controls operation of the motor 514 according to a control signal input from the DSP unit 580.

The imaging device 512 receives an optical signal input from the optical unit 511 so as to form an image of the subject. For example, the imaging device 512 may be a complementary metal-oxide semiconductor (CMOS) sensor array or a charge-coupled device (CCD) sensor array.

Since an electrical signal provided by the imaging device 512 is an analog signal, the input signal processing unit 513 may include an A/D converter for converting the analog signal into a digital signal, and may also include a circuit for performing signal processing such as gain adjustment or waveform regulation on the electrical signal provided by the imaging device 512.

The UI 520 may include elements required when a user manipulates the digital image processing apparatus or manages various photographing setups. For example, the UI 520 may have a form of buttons, keys, a touch panel, a touch screen, a dial or the like and may input user control signals such as power on/off, photographing start/stop, playback start/stop/search, optical system driving, mode change, menu manipulation and selection manipulation signals.

The SDRAM 530 may temporarily store RAW data (RGB data) of an image provided by the input signal processing unit 513. According to a required calculation, the temporarily stored RAW data may be transmitted to the DSP unit 580 to perform image signal processing or may be transmitted to another element. The input signal processing unit 513 may provide RAW data of a portion of an image.

Also, the SDRAM 530 may temporarily store executable data converted from data of an algorithm stored in the flash memory 540. By using the data stored in the SDRAM 530, the DSP unit 580 may perform a calculation so as to perform an operation according to the algorithm. Furthermore, the SDRAM 530 may temporarily store image data decompressed from an image file stored in the flash memory 540. The temporarily stored image data may be transmitted to the LCD 560 so as to be displayed as an image. For example, the SDRAM 530 may be replaced by one of various volatile memories for temporarily storing data while power is provided, or a semiconductor device in which a plurality of memory devices are integrated.

The flash memory 540 may store an operating system (OS) and an application program required to operate the digital image processing apparatus, and data required to execute an algorithm of a control method related to the present embodiment. For example, the flash memory 540 may be replaced by one of various non-volatile memories such as read-only memory (ROM).

The SD/CF/SM card 550 may record an image file generated by compressing image data provided by the input signal processing unit 513. For example, the SD/CF/SM card 550 may be replaced by a hard disk drive (HDD), an optical disk, an optical magnetic disk or a hologram memory.

The LCD 560 may display in real time an image corresponding to image data provided by the input signal processing unit 513, or may display an image corresponding to image data restored from an image file stored in the SD/CF/SM card 550. Although the LCD 560 is illustrated in FIG. 5, embodiments are not limited thereto and an organic light emitting diode (OLED) or an electrophoretic display (EPD) may also be used.

The audio signal processing unit 571 converts a digital signal of a sound source provided by DSP unit 580 into sound, and amplifies and transmits the sound to the speaker 572 so as to output the sound. Alternatively, the audio signal processing unit 571 may convert sound input through the MIC 573 into a digital signal and may compress the digital signal so as to generate an audio file. Then, the audio file may be transmitted to DSP unit 580 so as to perform calculation.

The DSP unit 580 may reduce noise from input image data and may perform image signal processing such as gamma correction, color filter array interpolation, color matrix, color correction or color enhancement. Also, the DSP unit 580 may generate an image file by compressing image data obtained by performing image signal processing, or may restore the image data from the image file. A compression format may be a reversible format or an irreversible format. Appropriate examples of the compression format may be a Joint Photographic Experts Group (JPEG) format and a JPEG 2000 format. Furthermore, the DSP unit 580 may functionally perform coloring, blurring, edge enhancement, image analysis, image recognition, image effect processing and the like. Image recognition may include scene recognition.

In addition, the DSP unit 580 may perform image signal processing required to display an image on the LCD 560. For example, the DSP unit 580 may perform luminance level adjustment, color correction, contrast adjustment, edge enhancement, screen division, character image generation, image composition and the like. The DSP unit 580 may be connected to an external monitor 200, may perform image signal processing appropriately for the external monitor 200, and may transmit to the external monitor 200 image data on which image signal processing is performed so as to display an image on the external monitor 200.

The DSP unit 580 detects a face from an image. If a face is detected, the DSP unit 580 may determine whether a live-view image corresponds to a night landscape mode, a backlight mode and a portrait mode in a descriptive order. If a face is not detected, the DSP unit 580 may determine whether the live-view image corresponds to a night landscape mode, a landscape mode, a macro mode and an auto exposure mode in a descriptive order. The above-mentioned scene modes are examples and may be variously changed or added.

The DSP unit 580 performs image signal processing as described above and may control other elements according to results of the image signal processing. Also, the DSP unit 580 may control the other elements according to user control signals input through the UI 520. An algorithm for performing image signal processing is stored in the flash memory 540, and is converted into executable data for performing calculation so as to be stored in the SDRAM 530. Accordingly, the DSP unit 580 may perform calculation.

Figure 6:
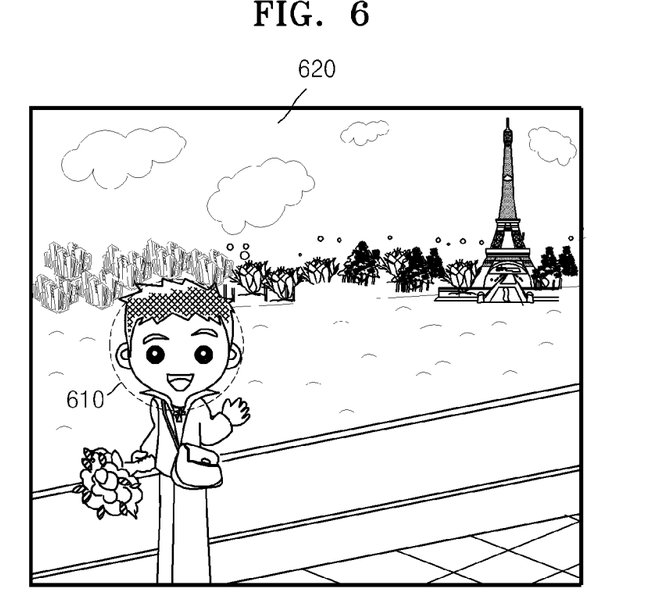
FIG. 6 is an image for describing a method for selectively storing a region of interest (ROI) in a RAW format, according to an embodiment.

FIG. 6 is an image for describing a method for selectively storing a region of interest (ROI) in a RAW format, according to an embodiment.

ROI Setup

A user may set an ROI on a live-view image. The ROI differs according to a photographing mode and thus the ROI may be predetermined according to the photographing mode. After that, the user may additionally adjust a range of the predetermined ROI by using, for example, a graphical user interface (GUI).

For example, a face that is detected from an image by using an automatic face detection method may be set as the ROI. For example, on an image of a person, a characteristic-based face detection method for detecting a region similar to a face region by using unchanging facial characteristics (e.g., facial elements such as eyes, a nose and a mouth, texture, skin colors, etc.) may be used. A currently popular face detection method is a support vector machine (SVM)-based face detection method.

Furthermore, a face image, an upper body image, a full body image and a group image are identified based on a ratio of a face region to a whole image, and the ROI may be appropriately set according to the type of image. For example, on a full body image, a face portion may be selectively set as the ROI.

Also, the ROI may be set by using an object tracking method. For example, a method of detecting a moving portion in a live-view mode and continuously tracking the moving portion may be performed by using motion estimation. For example, if a car is tracked, a region of the car is determined on a live-view image and a corresponding region when a still image is captured may be set as the ROI.

The user may adjust the ROI displayed on a display unit (e.g., the display unit 23 illustrated in FIG. 2 or the first display panel 47 illustrated in FIG. 3) by using buttons of a digital image processing apparatus (e.g., the wide angle-zoom button 21w and the telephoto-zoom button 21t illustrated in FIG. 2 or the menu/OK button 50, the upward button 51up, the rightward button 51ri, the downward button 51lo and the leftward button 51le illustrated in FIG. 4). Also, the ROI may also be set by using touch.

Referring to FIG. 6, a face region of a person to be photographed may be predetermined as an ROI 610 so as to be displayed to a user. If the user wants to increase the ROI 610, the user may additionally change the ROI 610 by using, for example, a GUI.

Storing Method

After the ROI 610 is set as described above, an image is stored.

Various methods may be used to store the image. First, the ROI 610 may be stored in a RAW format. Then, a non-ROI 620 other than the ROI 610 may be stored in a compression format such as a JPEG format. Also, both of the ROI 610 and the non-ROI 620 may be additionally stored in a compression format such as a JPEG format. This type of a storing method may be changed according to a setup of a user.

Composition of ROI and Non-ROI

The ROI 610 stored in a RAW format may be composited with the non-ROI 620 so as to generate a new image.

A user may change the ROI 610 by using various parameters provided by a camera or developing software installed in a personal computer (PC). For example, a wide dynamic range (WDR) function or a face beauty function may be applied to the ROI 610.

If the WDR function is applied to only the ROI 610, a dynamic range is much wider than a case when the WDR function is applied to a whole image including the ROI 610 and the non-ROI 620, because the ROI 610 may probably have a histogram inclined to one side in comparison to the whole image and thus the WDR function may be easily applied to the ROI 610.

After the ROI 610 in a RAW format is separately processed, when the ROI 610 is composited with the non-ROI 620, an a blending method is used as represented by Equation 1. The a blending method is a composition method generally used in an LCD. A value of the a blending may be appropriately determined according to an embodiment. A method of compositing the ROI 610 with the non-ROI 620 may be variously changed and is not limited to the a blending method.

$$I_{SY}(x,y)=\alpha(x,y)\times I_{full}(x,y)+(1-\alpha(x,y))\times I_{ROI}(x,y) \quad \text{[Equation 1]}$$

In Equation 1, $I_{SY}(x,y)$ represents an image value composited at a certain location (x,y), $I_{full}(x,y)$ represents an image value at the same location (x,y) on an image of a full resolution decoded from a compressed file, and $I_{ROI}(x,y)$ represents an image value obtained by developing a RAW format image of the ROI 610 by using a parameter.

Figure 7:
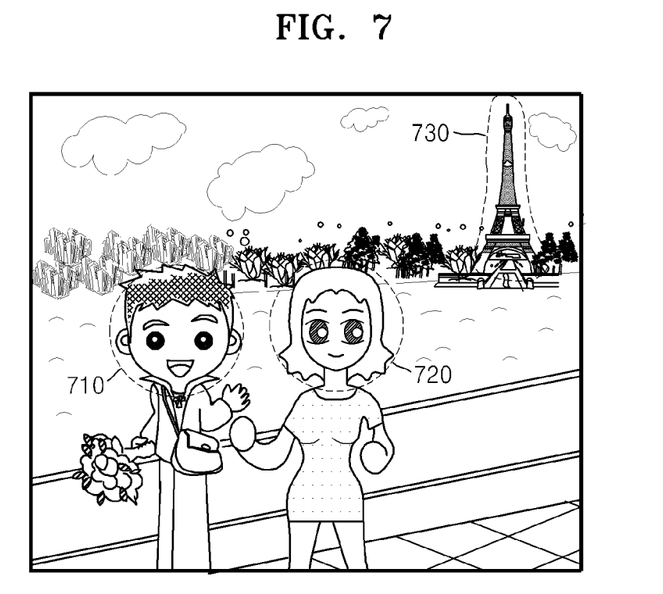
FIG. 7 is an image for describing a method for selectively storing a plurality of ROIs in a RAW format, according to an embodiment.

FIG. 7 is an image for describing a method for selectively storing a plurality of ROIs in a RAW format, according to an embodiment. As illustrated in FIG. 7, a plurality of ROIs may be selectively set in a single image.

Referring to FIG. 7, ROIs 710 and 720 that are automatically determined by using, for example, a face recognition method may be displayed to a user. If the user wants to set another ROI 730, the user may manually select and add the ROI 730.

If the user does not want to store any of the predetermined ROIs 710 and 720 in a RAW format, the user may delete the predetermined ROIs.

Figure 8A:
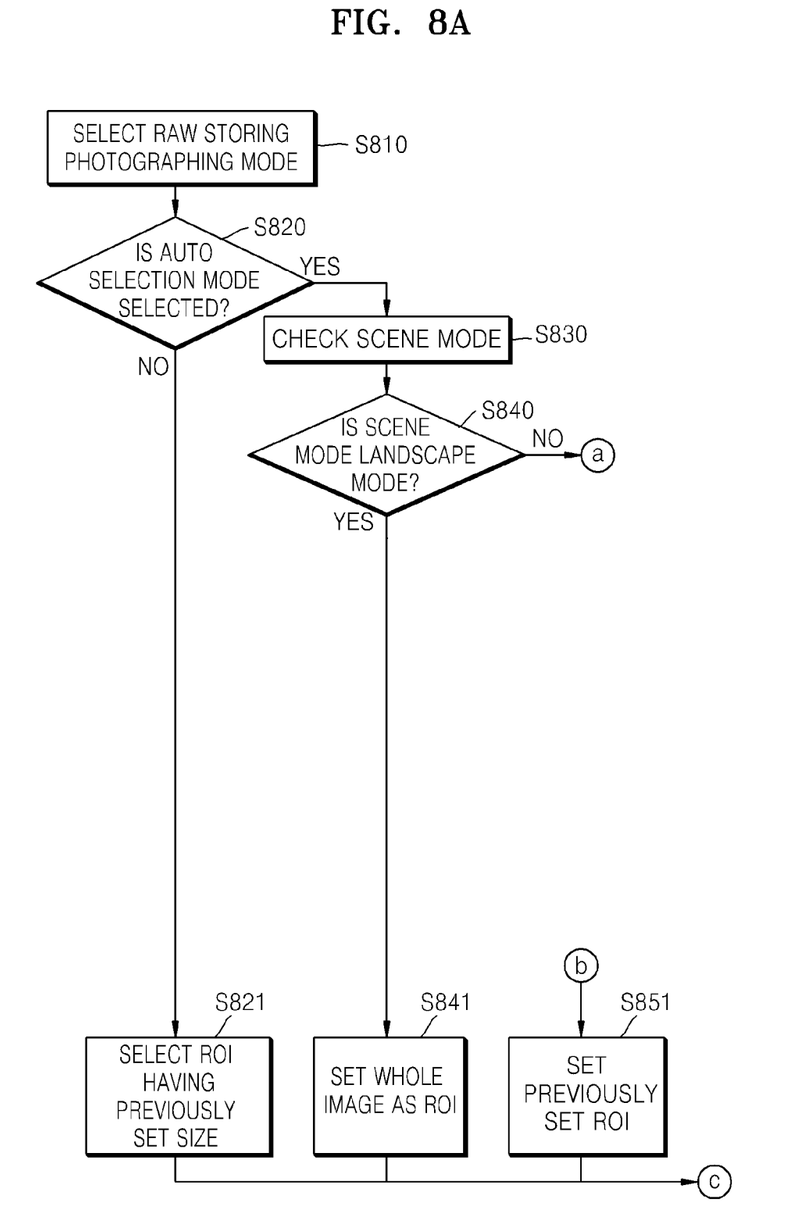
FIG. 8A and FIG. 8B are a flowchart of a method of selectively supporting a RAW format, according to an embodiment.
Figure 8B:
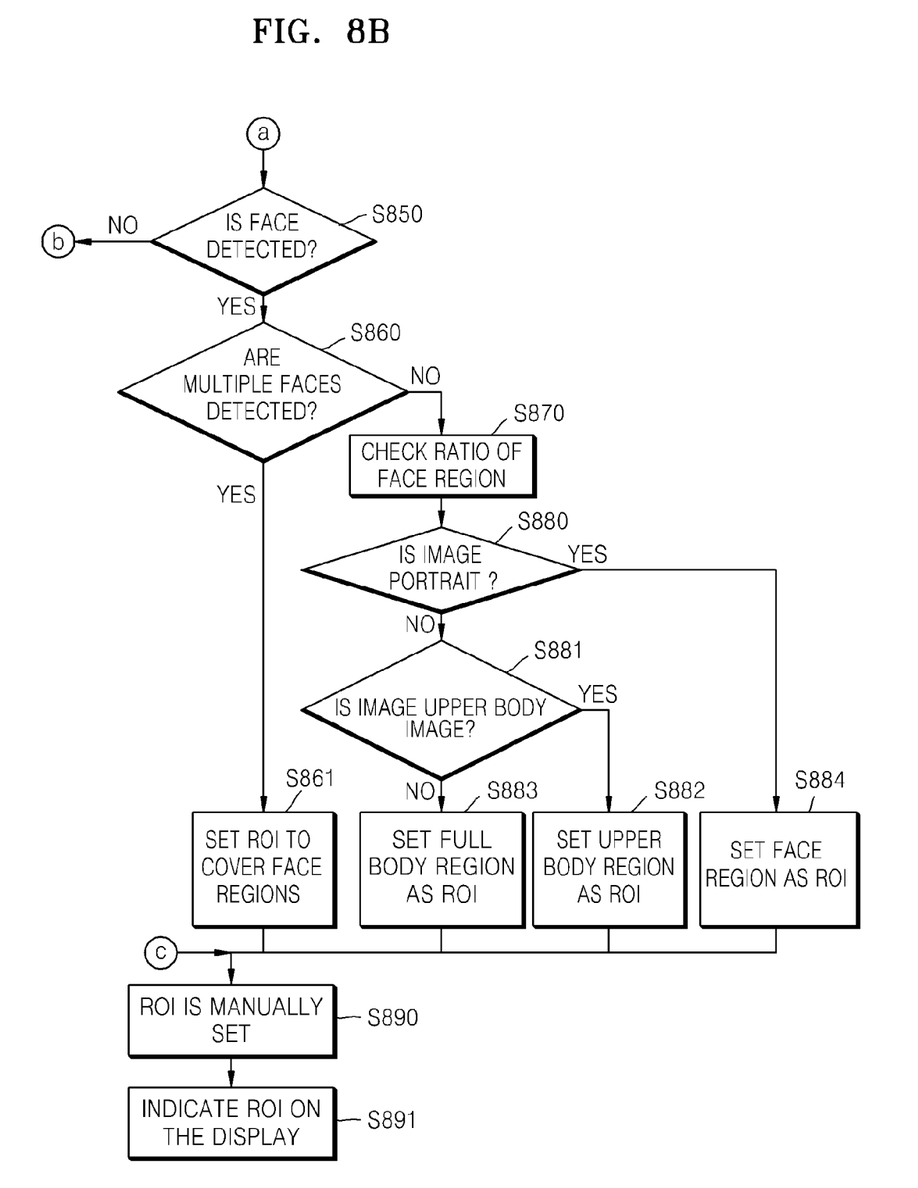

FIG. 8A and FIG. 8B are a flowchart of a method of selectively supporting a RAW format, according to an embodiment. The method of FIGS. 8A and 8B is an example and the invention is not limited thereto.

Referring to FIGS. 8A and 8B, a user selects a RAW storing photographing mode for storing an ROI in a RAW format (operation S810). After that, it is determined whether an auto selection mode for automatically selecting an ROI according to an image is selected (operation S820). If the auto selection mode is not selected, an ROI having a preset size is selected (operation S821). If the auto selection mode is selected, a scene mode is checked (operation S830).

If the scene mode is a landscape mode (operation S840), a whole image is set as an ROI (operation S841). If the scene mode is not the landscape mode (operation S840), it is determined whether a face is detected from an image (operation S850). If a face is not detected, a predetermined ROI is set as an ROI (operation S851). Alternatively, the user may manually set an ROI.

If at least one face is detected, it is determined whether a plurality of faces are detected from an image (operation S860). If a plurality of faces are detected, each face region may be separately set as an ROI or a region including the majority of the faces is set as an ROI (operation S861).

If only one face is detected, a ratio of a face region to the whole image is checked (operation S870). The image is sorted as a portrait image when the ratio of the face region is more than a predetermined value (operation S880). If the image is classified as a portrait image, the face region is set as an ROI (operation S884). If the image does not belong to a portrait image, it is determined whether the image is a bust shot (operation S881). If the image is a bust shot, the region of bust is set as an ROI (operation S882). If the image is not a bust shot, a whole body region is set as an ROI (operation S883). In FIGS. 8A and 8B, a region to be set as an ROI may be variously changed according to the user's setup. Further, the ROI may be manually set by a user (operation S890). Then, the ROI is indicated on the display (operation S891).

Figure 9:
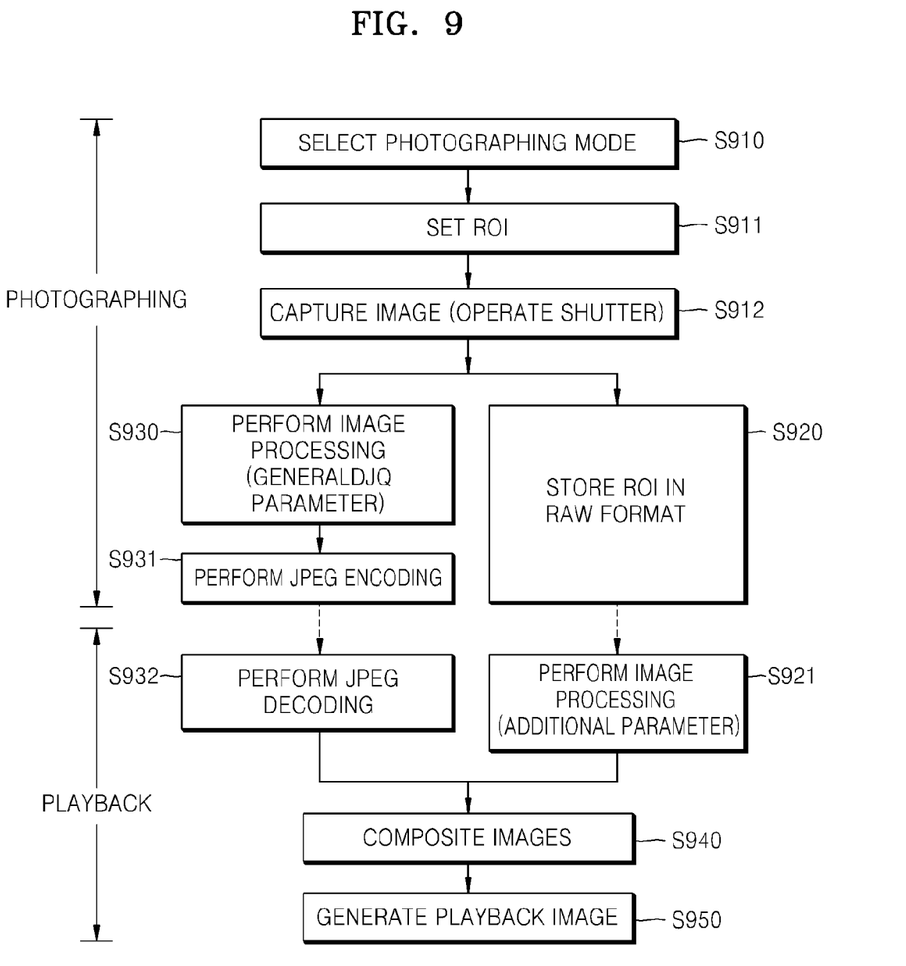
FIG. 9 is a flowchart of a method of setting a portion of an image as an ROI and compositing the ROI with a non-ROI, according to an embodiment.

FIG. 9 is a flowchart of a method of setting a portion of an image as an ROI and compositing the ROI with a non-ROI, according to an embodiment;

Referring to FIG. 9, a user selects a photographing mode and sets an ROI by using the method of FIGS. 8A and 8B (operations S910 and S911). A shutter operates so as to capture an image (operation S912). After the image is captured, the ROI is stored in a RAW format (operation S920). A non-ROI is image-processed by using a general parameter (operation S930) and then is JPEG-encoded (operation S931).

After that, in order to play the captured image back in a camera or a PC, the non-ROI is JPEG-decoded (operation S932) and the ROI in a RAW format is image-processed by using an additional parameter (operation S921). Examples of the additional parameter are a face beauty parameter, an image brightness parameter and a noise removal parameter.

After that, in order to display an ultimate image to the user, the non-ROI and the ROI are composited so as to generate a playback image (operations S940 and S950).

Figure 10:
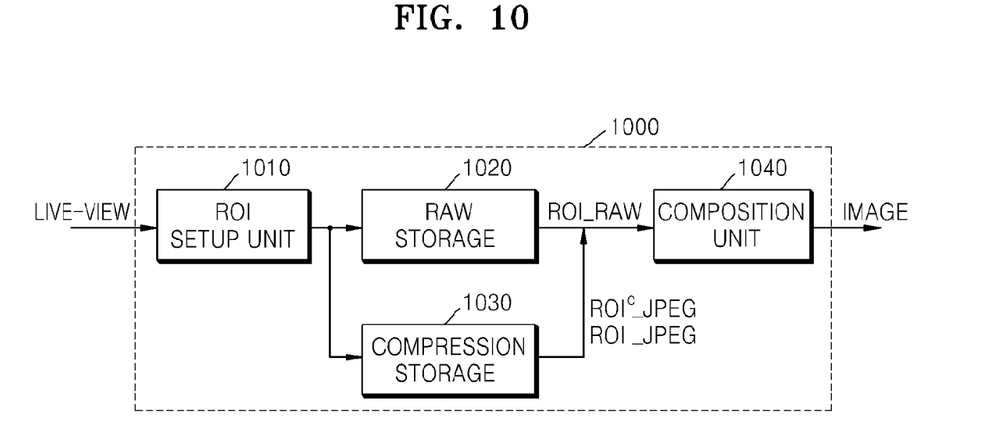
FIG. 10 is a block diagram of a digital image processing apparatus for selectively supporting a RAW format, according to an embodiment.

FIG. 10 is a block diagram of a digital image processing apparatus 1000 for selectively supporting a RAW format, according to an embodiment.

Referring to FIG. 10, the digital image processing apparatus 1000 includes an ROI setup unit 1010, a RAW storage 1020, a compression storage 1030 and a composition unit 1040.

The ROI setup unit 1010 sets at least one portion of an image displayed in a live-view mode as an ROI. A plurality of ROIs may be set in a single image (see FIGS. 6 and 7). Also, the ROI may be automatically set according to whether a scene mode is, for example, a landscape mode, a portrait mode or a night landscape mode (see FIGS. 8A and 8B). In more detail, if the scene mode is the portrait mode, a condition for setting the ROI may be preset according to a ratio of a face region on an image. Alternatively, a user may additionally change the ROI after the ROI is automatically set or may manually set from the start.

The RAW storage 1020 stores the ROI in a RAW format.

The compression storage 1030 stores a non-ROI in a compression format. A representative example of the compression format is a JPEG format. The compression storage 1030 may also store the ROI in a JPEG format.

The composition unit 1040 composites the ROI stored in the RAW storage 1020 with the non-ROI stored in the compression storage 1030 by using, for example, an a blending method. Before being composited by the composition unit 1040, the ROI and the non-ROI may be separately image-processed by using different parameters.

As described above, according to embodiments, a problem of requiring a large space of memory to store a whole captured image in a RAW format may be solved. Also, a user may store only a desired ROI in a RAW format and may use a different parameter for the ROI.

As such, even in a portable digital image processing apparatus such as a compact camera, a user may prevent reduction of image quality in a desired region of a captured image.

An apparatus as described herein may comprise a processor, a memory for storing program data executable by the processor, a permanent storage such as a disk drive, a communications port for handling communications with external devices, a user interface device such as a touch panel, keys, or buttons, and the like. Any processes may be implemented as software modules or algorithms, and may be stored as program instructions or computer readable codes executable on the processor on a non-transitory computer-readable storage media such as read-only memory (ROM), random-access memory (RAM), CD-ROMs, magnetic tapes, floppy disks, and optical data storage devices. The computer readable storage medium can also be distributed over network coupled computer systems so that the computer readable code is stored and executed in a distributed fashion. This computer readable code can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A method of supporting a RAW format (a sensor data format before image processing is performed) in a digital image processor, the method comprising:
   setting at least one portion of an image displayed in a live-view mode as a region of interest (ROI);
   storing the ROI in a RAW format;
   storing a non-ROI of the displayed image, which is a portion of the image other than the ROI, in a compression format; and
   compositing the stored ROI with the stored non-ROI;
   wherein the ROI is automatically set according to a condition that is predetermined based on a scene mode, and
   wherein, if the scene mode is a portrait mode, the ROI is automatically set according to a ratio of a face region recognized on the displayed image.

2. The method of claim 1, wherein the ROI comprises at least one region of the displayed image.

3. The method of claim 1, wherein the ROI is manually set by a user.

4. The method of claim 1, further comprising performing image processing on the ROI before the compositing of the ROI.

5. The method of claim 1, further comprising storing the ROI in a compression format.

6. The method of claim 1, wherein the compositing of the ROI is performed by using an α blending method.

7. The method of claim 1, wherein the ROI is set by using an object tracking method.

8. A digital image processing apparatus for supporting a RAW format (a sensor data format before image processing is performed), the processing apparatus comprising:
   an ROI setup unit that sets at least one portion of an image displayed in a live-view mode as a region of interest (ROI);
   a RAW storage that stores the ROI in a RAW format;
   a compression storage that stores a non-ROI of the displayed image, which is a portion of the image other than the ROI, in a compression format; and
   a composition unit that composits the stored ROI with the stored non-ROI;
   wherein the ROI setup unit automatically sets the ROI according to a condition that is predetermined based on a scene mode, and
   wherein, if the scene mode is a portrait mode, the ROI is automatically set according to a ratio of a face region recognized on the displayed image.

9. The digital image processing apparatus of claim 8, wherein the ROI comprises at least one region of the displayed image.

10. The digital image processing apparatus of claim 8, wherein the ROI is manually set by a user.

11. The digital image processing apparatus of claim 8, wherein image processing is performed on the ROI before the composition unit composits the stored ROI with the stored non-ROI.

12. The digital image processing apparatus of claim 8, wherein the compression storage further stores the ROI in a compression format.

13. The digital image processing apparatus of claim 8, wherein the composition unit composits the ROI using an α blending method.

14. The digital image processing apparatus of claim 8, wherein the ROI setup unit sets the ROI using an object tracking method.

15. The method of claim 1, wherein, if the scene mode is a mode other than the portrait mode, the ROI is automatically set otherwise than if the scene mode is the portrait mode.

16. The digital image processing apparatus of claim 8, wherein, if the scene mode is a mode other than the portrait mode, the ROI setup unit automatically sets the ROI otherwise than if the scene mode is the portrait mode.

* * * * *